July 16, 1957  C. W. ROSE  2,799,130
APPARATUS FOR PRE-DRAWING PORTIONS OF DRAWABLE ROPE
Original Filed May 24, 1951  2 Sheets-Sheet 1

Inventor
CLARENCE W. ROSE
By WHITEHEAD & VOGL
PER *Earle Whitehead*
Attorneys

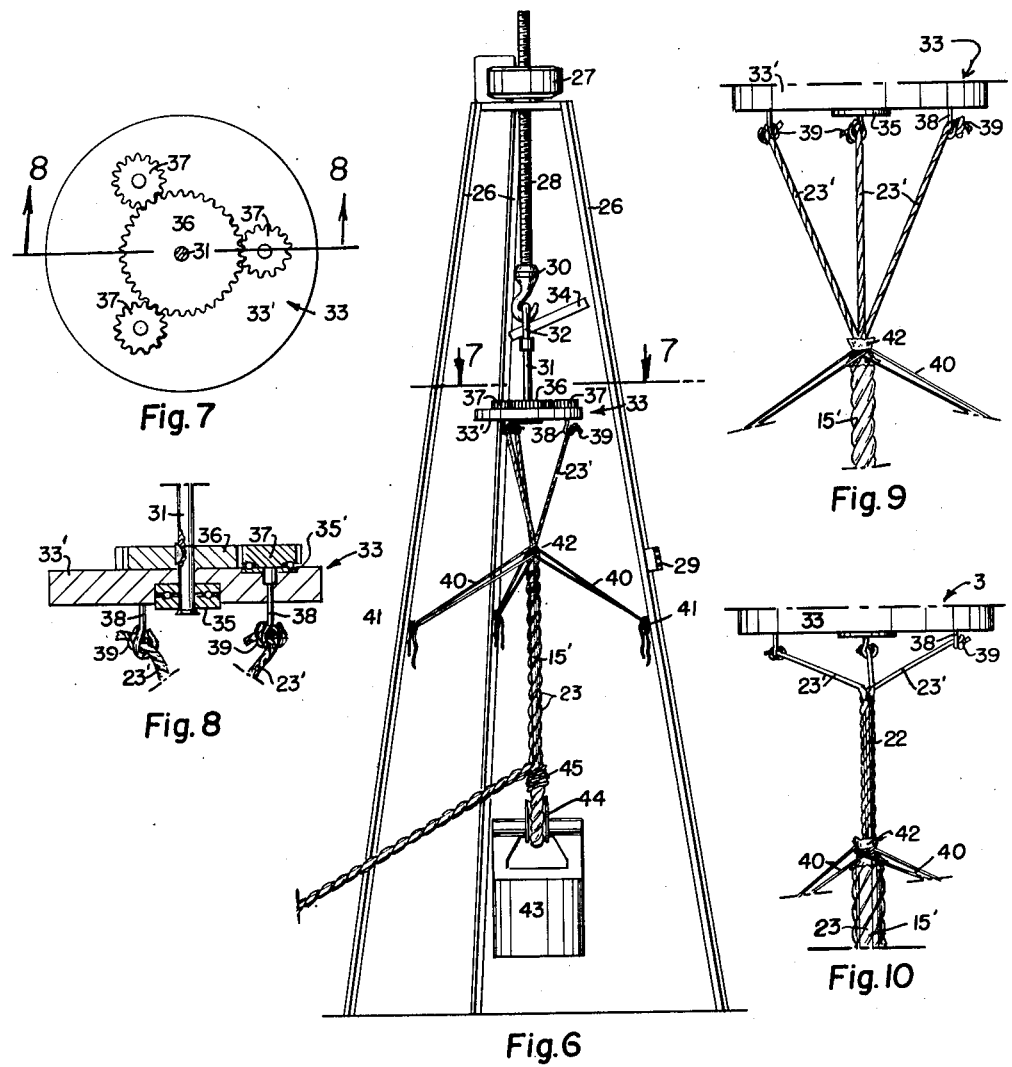

United States Patent Office 2,799,130
Patented July 16, 1957

2,799,130

APPARATUS FOR PRE-DRAWING PORTIONS OF DRAWABLE ROPE

Clarence W. Rose, Denver, Colo.

Original application May 24, 1951, Serial No. 228,042. Divided and this application June 26, 1953, Serial No. 364,307

5 Claims. (Cl. 57—1)

This invention relates to a method and apparatus for splicing drawable rope such as nylon and for forming a new and improved splice in such rope, and is a division of applicant's prior application, Serial No. 228,042, filed May 24, 1951, claiming herein subject matter disclosed in said prior application but not therein claimed. An object of the invention is to provide a splice in a drawn segment of otherwise undrawn rope.

Other objects of this invention include the provision of a splice in a drawn segment of otherwise undrawn rope which segment will not be loosened by drawing of the rope, which will retain the lay of the rope and not become unraveled or loosened by drawing or other manipulation of the originally undrawn portion of the rope; which permits the secure joining of drawable but undrawn rope with other types of rope; which is smaller than but as tight, compact and strong as the undrawn portion of the rope; which is especially adaptable for receiving a neat tight cover; which will retain a thimble as in an eye splice even after the rope is subjected to stress and fully drawn, and which is peculiarly adapted for such uses as joining to safety belts the safety ropes of such belts.

Still other objects of this invention include the provision of a new and novel method for drawing a selected portion of an undrawn, but drawable, rope; for so drawing such selected rope portion as to provide a clear point of demarcation between the undrawn and the drawn portions of the rope; for so drawing the selected rope portion without placing excessive strain upon the undrawn rope portion, thereby avoiding deformation or injury to the undrawn portion of the rope; for so drawing the selected rope portion and, coincidentally or subsequently, re-twisting and re-laying the fibres of the drawn strands and thereupon forming a new, tight lay of the drawn portion of the rope; and for so drawing a selected portion of the rope in a manner which is simple, easy and inexpensive.

Still other objects of this invention include the provision of a new and novel apparatus for drawing a selected portion of an undrawn, but drawable, rope which will draw the said selected portion and subsequently re-twist and re-lay the drawn strands; which may be operated either manually or mechanically; which is economical to build and to maintain in use.

With these, and other objects, in view, all of which more fully hereinafter appear, my invention comprises a certain new and novel article and new and novel steps and processes and combinations and arrangements of parts, as hereinafter described, and as defined in the appended claims, and illustrated in preferred embodiment in the accompanying drawing in which:

Figure 6 is an elevation view of apparatus for drawing, twisting and re-laying the strands of the end segment of a drawable rope.

Figure 7 is a section as taken on the indicated line 7—7 at Fig. 6.

Figure 8 is a section as taken on the indicated line 8—8 at Fig. 7.

Figure 9 is a fragmentary view of the apparatus illustrated at Fig. 6, showing the portion holding the strands, and showing the strands being twisted in preparation for their re-laying.

Figure 10 is similar to Fig. 9 but showing the strands laid, as upon completion of the drawing and relaying operation, preliminary to forming a splice.

Figure 11 is a fragmentary detail, on an enlarged scale, of the juncture between the drawn and the undrawn portions of the drawable rope.

Figure 12 is a fragmentary detail similar to Fig. 11, but showing further the manner of looping a thong around the rope as for drawing.

The production of fibrous materials from nylon and some similar plastics, hereinafter referred to as nylon, requires a drawing step to properly condition the fibres. The molecular structure of such materials has a characteristic property which permits a large permanent elongation at the yield point of a fibre under tension, and before a permanent set occurs. However, once the fibre is drawn, it attains its ultimate strength. This characteristic property is taken advantage of in the construction of various types of safety belts and ropes, for such a rope will draw out or permanently elongate in an inelastic manner under sufficient force, such as that exerted by a falling body attached to the rope. This drawing will absorb the energy generated by such a fall and eliminate sudden and severe shocks, which are dangerous and constitute an undesirable feature of safety belts and ropes of substantially nonyielding character. The dangerous rebound incident to the use of ropes having great elasticity is also avoided.

However, it follows that a safety rope of undrawn material, once drawn, loses its normal shape, becoming smaller in diameter as it increases in length, and acquiring a slack, limp lay of the strands, and the splices and hitches, made in or with such rope, likewise become limp, disconnect from the thimbles and tend to fall apart once the rope is again slacked. Once drawn, such rope is generally incapable of another use, but it is desirable, and often essential, that the splices or joining means of the rope remain secure, so that the safety rope can not become disconnected from its anchorage by subsequent handling of the drawn rope. To solve this problem, the present invention was conceived and developed, and comprises in essence, a splice formed in a pre-drawn section of an otherwise undrawn nylon rope and consists, further, in a method and apparatus for pre-drawing a segment of an undrawn nylon rope preparatory to forming a splice or hitch. It was discovered that such a splice is neat in appearance and is adaptable for covering with a jacket, of leather or other material, and insures the maintenance, in unaltered condition, of the elements of the connecting assembly.

Figure 1:
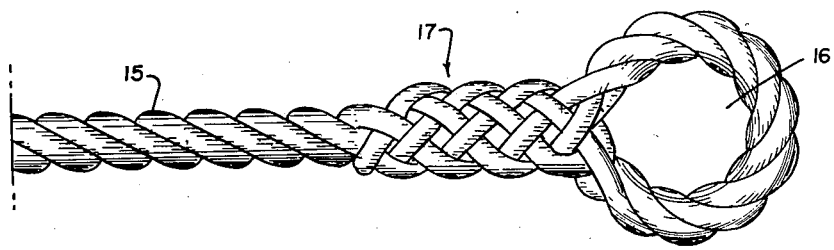
Figure 1 shows a portion of undrawn rope with a conventional eye splice formed at one end.

In considering the conventional eye splice, as illustrated at Fig. 1, it is to be noted that the end of rope 15 is reversed upon itself to form an eye 16, and that the ends of the strands are then tucked into the lay of the rope adjacent the eye to form the splice 17. The diameter of the rope in the eye 16 is the same as the diameter of the rope 15 and the diameter of the splice 17 is appreciably greater. The illustration is of either ordinary or undrawn nylon rope. If the rope be undrawn nylon, it may be drawn to as much as five times its original length, whereupon the lay of the rope will naturally become limp, and the portion forming the splice 17 will likewise become limp, the splice loosened and the eye internally enlarged. This undesirable condition is known to those skilled in the art, and considerable effort has been expended to develop a satisfactory means of joining the end of a generally undrawn nylon rope, either to another rope or to itself in a splice.

Figure 2:
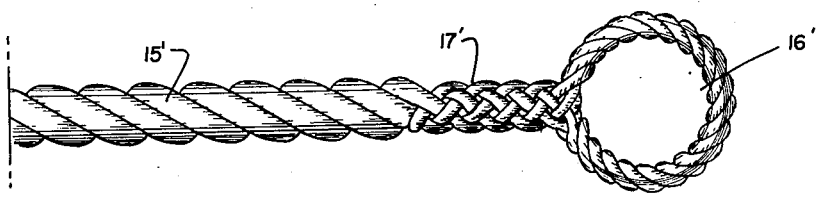
Figure 2 illustrates a portion of drawable rope with the end segment pre-drawn in accordance with the present invention, and with an eye splice formed therein.
Figure 3:
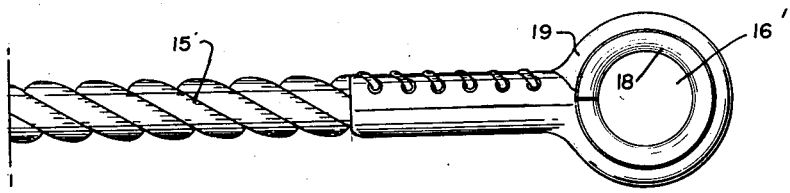
Figure 3 illustrates the Fig. 2 structure with a protective jacket covering the eye and splice and with a thimble in the eye.

An eye splice may be tied in a rope of undrawn nylon 15' in accordance with the present invention where a sufficient portion is pre-drawn, as in a manner hereinafter described, to permit the forming of an eye 16' and a splice 17' in such pre-drawn portion, all as clearly illustrated at Fig. 2. It is to be noted that in such an eye splice the strands in the loop forming the eye 16' are considerably smaller in diameter than those of the undrawn rope portion 15', and that the splice 17' may be no larger in diameter than the undrawn rope portion 15'. The smaller diameter of the splice 17' not only improves the appearance of the eye splice over that of a conventional splice, but also permits the splices to be neatly covered and shielded as by a leather jacket 19, as clearly illustrated at Fig. 3 where a conventional thimble 18 is also illustrated. Further, this splice can not be stretched, deformed or normally broken because it is formed with pre-drawn fibres which retain all of their original strength. Moreover, the rope is double in the spliced area.

Figure 5:
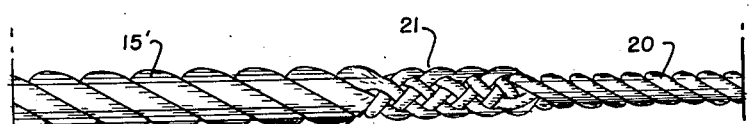
Figure 5 shows a running splice joining a pre-drawn end portion of drawable rope with a non-drawable rope.

A pre-drawn segment of an undrawn nylon rope may be used to connect the undrawn rope with other ropes as by splicing, as shown by the short running splice illustrated at Fig. 5. In such case, the undrawn nylon rope 15' is connected with a conventional undrawable rope 20, a running splice 21 being made with the strands of the undrawable rope 20 and strands of a pre-drawn portion of the otherwise undrawn nylon rope 15'. Where the strands of the rope 20 are about the same size as the strands of the pre-drawn portion of the rope 15', it is to be noted that the splice is small in diameter, and neat and compact compared with the undrawn portion of the rope 15'.

Figure 4:
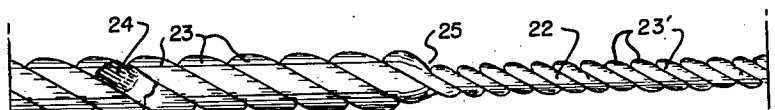
Figure 4 illustrates a piece of drawable rope with its end pre-drawn, twisted and laid as in preparation for forming a splice.

In the formation of a rope, having a plurality of strands 23 laid or wrapped about each other with each strand comprising a number of individual fibres 24 (as illustrated at Fig. 4), it is essential that there be an adequate number of twists of the fibres in each strand and an adequate number of wraps in the lay of the strands about each other in a given length of rope to provide a rope of desirable rigidity and hardness. Generally, the smaller the rope, the more twists and wraps per given length are required. It follows that if a given length of rope is drawn, to say five times its former length, without any change of strand twists or lay wraps the result will be an exceedingly limp and slack aggregate of fibres and strands. A splice in such a rope is entirely unsatisfactory. The basic steps in forming a pre-drawn portion, as 22, of an otherwise undrawn rope, is to grip and hold the ends of the strands 23' of that portion of the strands 23 of the rope 15' which are to be pre-drawn; to draw said strands until the fibres in such strands are fully drawn; then to twist the fibres 24 of each strand 23' to a desired degree of tightness, and to then again wrap or lay the strands 23' about each other with their new and increased twist holding them in the tighter and closer re-lay.

It is essential that the rope should be gripped at the point which is to be the limit of the pre-drawn portion, indicated by shoulder 25, Fig. 4, and the individual strands 23 should be gripped and separated at their ends preliminary to the drawing operation.

A pre-stressing of the rope, as with a tensile load which is not quite sufficient to cause drawing, assists the operation by reducing the necessary gripping force at shoulder 25, thereby lessening the possibility of bruising the rope fibres at that point by such gripping.

Adequate soaking of the rope in water or other softening agent, which will not materially change the permanent properties of the nylon, reduces to a considerable extent, the force required to draw nylon rope, and this step will facilitate the pre-drawing operation.

A preferred apparatus for drawing a segment of a nylon rope is illustrated at Figs. 6 through 10 and Fig. 12, and as here illustrated comprises a frame for suspension of the rope which is, conveniently, a tripod 26 having, at its apex hoisting or raising means here illustrated as a motorized lift 27 operable by switch 29 to raise, lower or hold a vertical shaft 28. A conventional chain or cable hoist may be used. Shaft 28 is disposed in the upper portion of the tripod 26 and carries a swiveled hook 30 at its lower end. Center bar 31 is suspended from hook 30 by an eye 32 and carries a spinner head 33 at its lower end. Eye 32 is of sufficient proportions to receive a bar 34 adapted to rotate the bar 31 and the gears in the spinner head 33 carried thereby.

The spinner head 33, including a plate 33', is pivotally hung from the center bar 31, suitable bearings 35 being provided to lessen frictional resistance between the plate 33' and the bar 31. A center or sun gear 36 is affixed to the center bar 31 above and adjacent the plate 33' and meshes with three planetary gears 37 which are rotatably mounted upon said plate about said center gear. While three planetary gears 37 are shown, for use with conventional 3-strand rope, this gearing may be modified in any manner necessary to conform with different types of rope.

The planetary gears 37 are mounted upon bearings 35' with carrier hooks 38, or other attachment means, depending therefrom through the plate 33', said hooks being adapted to engage the ends of strands 23 of a rope 15'. These strands 23' may be connected to hooks 38 in any suitable manner as by simply knotting their ends as at 39. It follows that any rotation of the center gear 36 causes simultaneous rotation of the hooks 38 carried by the planetary gears 37; and this action may be used to twist each of the strands 23', connected to said hooks, to a uniform tightness.

Prior to this twisting operation, the plate 33' will have been rotated, responsive to the force of the drawing operation, in such reverse manner as to partially separate and remove the lay of the strands of the drawn portion of the rope, the head is then rotated to remove the balance of the lay as illustrated in Fig. 9, and the plate must be held against rotation during the fibre twisting operation. The subsequent release of said plate 33' causes it to revolve, due to tension resulting from the fibre twisting of the strands. This tension-induced rotation causes a re-lay in the drawn segment of the rope, which neutralizes or balances the twist in the strands.

The rope 15' must be held, by any suitable means, at the point of the shoulder 25. In the herein described embodiment the rope 15' is engaged at the point of the shoulder 25, by suitable thongs 40, there being a thong connected to each leg of the tripod as by hooks 41, the triangular disposition of the thongs causing an even distribution of the forces exerted on the rope. Each thong is wrapped one full turn about the rope 15' and preferably over a shield 42, which may be of a soft, tough material, interposed between the thongs and the rope 15'. The shield is not shown at Fig. 12 as it is unnecessary for the purpose of that figure. It follows that any pull upon the rope 15' from the spinner head 33 will cause the thongs 40 to tightly grip the rope and avoid slipping.

When the rope is soaked, as step prior to the drawing, it is desirable to soak exactly that portion of the rope which is to be drawn and the grip of the thongs on the rope should be applied at the exact point where the wet and dry portions of the rope meet.

It is desirable to apply to the rope, below the point of attachment of the thongs, the maximum pretension which will stretch the rope to the limit of its elasticity but which is just insufficient to draw the rope. Such pretension will appreciably lessen the required force of the thongs 40 on the rope at the shoulder 25 and thus lessen the danger of injury to the rope at that point. This pretension may comprise simply a weight 43 carrying a thimble 44 about which the rope may be wrapped and fastened as with a cord 45, as clearly illustrated at Fig. 6.

If equivalent, horizontally disposed, apparatus is used, the pre-tension applied by means of a weight may be obtained by running the rope over a pulley.

In operation, the rope 15' is mounted in the apparatus as illustrated at Fig. 6 with the strands 23 of the rope upper end interrelatively untwisted sufficiently to be respectively secured to the hooks 38. Switch 29 is operated resulting in raising rod 28 and spinner head 33 and causing tension on the rope by lifting weight 43. The thongs 40 then come into play and the further lifting of head 33 causes the thongs to grip and arrest the movement of the rope at shoulder 25, resulting in the elongation of the portion above the shoulder as the spinner head continues to be raised. This results in drawing said upper portion which drawing is continued until said upper portion has been drawn to its limit whereupon the strands are twisted by the planetary gears and then re-layed into a drawn rope, all in the manner hereinbefore described.

While I have herein described and illustrated several forms of my product, various steps of a method and a preferred apparatus, other and equivalent products, modifications and alterations of apparatus and steps will occur to those skilled in the art, all within the scope and spirit of my invention, hence it is my desire that I be limited in my protection, not by the embodiments and details herein illustrated and described, but only by the scope of the appended claims.

I claim:

1. Apparatus for drawing a predetermined portion of an otherwise undrawn rope, formed of twisted strands of drawable fibres of a character which may be permanently greatly elongated before attaining a fully drawn state, comprising, in combination, rope anchoring means adapted to grip and hold the rope at a point which is one end of said portion, a head including a plurality of strand gripping means adapted to individually grip and hold the strands of the rope at a point which is the other end of said portion, pulling means adapted to pull the head away from the anchor means and thereby draw the strands in said portion and twisting means adapted to twist said strand gripping means whereby to permit the strands in said portion to be retwisted after being drawn to a tightness comparable with the tightness of the original twist of the undrawn strands.

2. Apparatus for drawing a predetermined portion of an otherwise undrawn rope, formed of twisted strands of drawable fibres of a character which may be permanently greatly elongated before attaining a fully drawn state, comprising, in combination, rope anchoring means adapted to grip and hold the rope at a point which is one end of said portion, a rotatable head carrying gears in a planetary arrangement, gripping means on each planet gear adapted to grip and hold a strand at a point which is at the other end of said portion and pulling means adapted to pull the head away from the anchor means and thereby draw the strands in said portion, each planetary gear being adapted to rotate and twist the strand attached thereto and relay its fibres and said head being adapted to rotate and interrelatively relay the strands.

3. The apparatus as defined in claim 2 wherein said planetary gears are interconnected to a sun gear and including swivelled means between the head and pulling means for selectively rotating the sun gear of said planetary system and thereby rotating the planetary gears on their respective axes without rotation about the sun gear, and for rotation of planetary gears about the sun gear with or without rotation of the planetary gears about their respective axes.

4. In the organization defined in claim 1 said means for holding the rope at said point comprising a plurality of thongs anchored to the frame and adapted to be looped about the rope at said holding point.

5. The organization defined in claim 4 including yieldable force means adapted to be applied to the rope and opposing the force of said pulling means whereby to prestress the rope and reduce the force required to be applied at the holding point.

References Cited in the file of this patent
UNITED STATES PATENTS

| | | |
|---|---|---|
| 93,265 | Wright | Aug. 3, 1869 |
| 2,238,694 | Graves | Apr. 15, 1941 |